US005905496A

United States Patent [19]

Lau et al.

[11] Patent Number: 5,905,496

[45] Date of Patent: May 18, 1999

[54] WORKFLOW PRODUCT NAVIGATION SYSTEM

[75] Inventors: Frankie Lau, Pleasanton; Bangalore D. Madhuchandra; Theresa Brown, both of Milpitas; Nagendra Nagarajayya, Sunnyvale; Nandita Gupta, Santa Clara; Ling (Leland) Chen, Fremont; Lani Stalun, Redwood City; Ashok Gourishety, Fremont; Sarma Ballamudi, Milpitas, all of Calif.

[73] Assignee: Sun Microsystems, Inc., Palo Alto, Calif.

[21] Appl. No.: 08/678,447

[22] Filed: Jul. 3, 1996

[51] Int. Cl.[6] .......... G06F 15/00

[52] U.S. Cl. .......... 345/339; 345/340; 345/348; 345/352

[58] Field of Search .......... 345/352, 326, 345/329, 330, 331, 332, 333, 34, 335, 339, 340–348, 349, 353, 354; 707/10, 102, 103, 104; 705/8

[56] References Cited

U.S. PATENT DOCUMENTS

| | | | |
|---|---|---|---|
| 5,247,611 | 9/1993 | Norden-Paul et al. | 707/504 |
| 5,333,252 | 7/1994 | Brewer, III et al. | 707/506 |
| 5,450,545 | 9/1995 | Martin et al. | 395/701 |
| 5,471,575 | 11/1995 | Giansante | 707/503 |
| 5,561,793 | 10/1996 | Bennett et al. | 707/201 |
| 5,619,708 | 4/1997 | Ho | 707/506 |
| 5,634,095 | 5/1997 | Wang et al. | 345/348 |
| 5,640,577 | 6/1997 | Scharmer | 707/507 |
| 5,701,400 | 12/1997 | Amado | 706/45 |

OTHER PUBLICATIONS

Microsoft® Project for Windows Feature Guide, Version 1.0, Mircrosoft Corporation, 1990. pp. 12–25 and 114.

*Primary Examiner*—Huynh Ba

*Attorney, Agent, or Firm*—Skjerven, Morrill, MacPherson, Franklin & Friel L.L.P.; Ken J. Koestner

[57] ABSTRACT

A workflow or product navigation system includes a single top-level screen which allows access to all aspects of the product information through selection of a single entry. The top-level screen includes a menu bar, a plurality of selectable icon push buttons in an icon area for directing inquiry to all aspects of the product information, and a product listing area. A user may select from several orderings of the icons to most efficiently access the product data. In particular, the icons are arranged in a preselected order as determined according to a business unit default definition. The user may select an alternative user-defined selection and ordering of icons, or a list of all icons in a predefined, fixed order. The icons on the top-level screen convey many details regarding the status of the product information. An icon, on its face, designates the user-access status of the information as read-write or read-only access. If a user has no access to information underlying the icon, no icon is displayed. An icon, on its face, expresses the data-content status of the information as being unfilled, copied from another source, or saved.

27 Claims, 17 Drawing Sheets

FIG. 6A

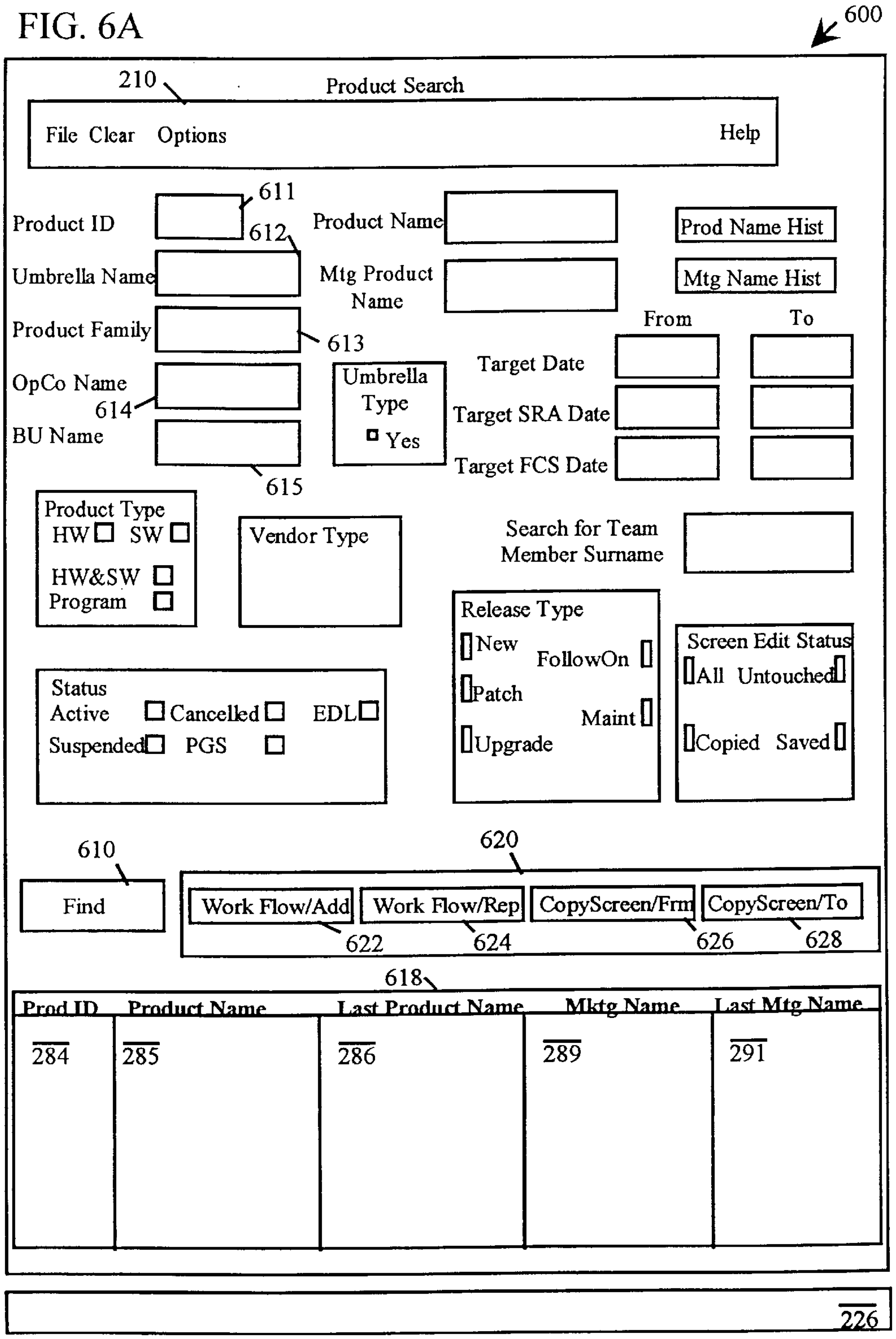

Product Search

File  Clear  Options                                       Help

Product ID  [611]  Product Name [ ]   Prod Name Hist

Umbrella Name [612]   Mtg Product Name [ ]   Mtg Name Hist

Product Family [ ]                        From        To

OpCo Name [ ]   Umbrella Type   Target Date  [ ] [ ]
                ☐ Yes           Target SRA Date [ ] [ ]
BU Name [614]                    Target FCS Date [ ] [ ]
          615

Product Type
HW ☐  SW ☐     Vendor Type        Search for Team Member Surname [ ]
HW&SW ☐
Program ☐

Release Type
                                 ☐ New      FollowOn ☐      Screen Edit Status
                                 ☐ Patch                    ☐ All  Untouched ☐
Status                                      Maint ☐
Active ☐ Cancelled ☐ EDL ☐       ☐ Upgrade                  ☐ Copied  Saved ☐
Suspended ☐ PGS ☐

610                      620
[Find]     [Work Flow/Add] [Work Flow/Rep] [CopyScreen/Frm] [CopyScreen/To]
                622             624             626              628
          618

| Prod ID | Product Name | Last Product Name | Mktg Name | Last Mtg Name |
|---------|--------------|-------------------|-----------|---------------|
| 284     | 285          | 286               | 289       | 291           |

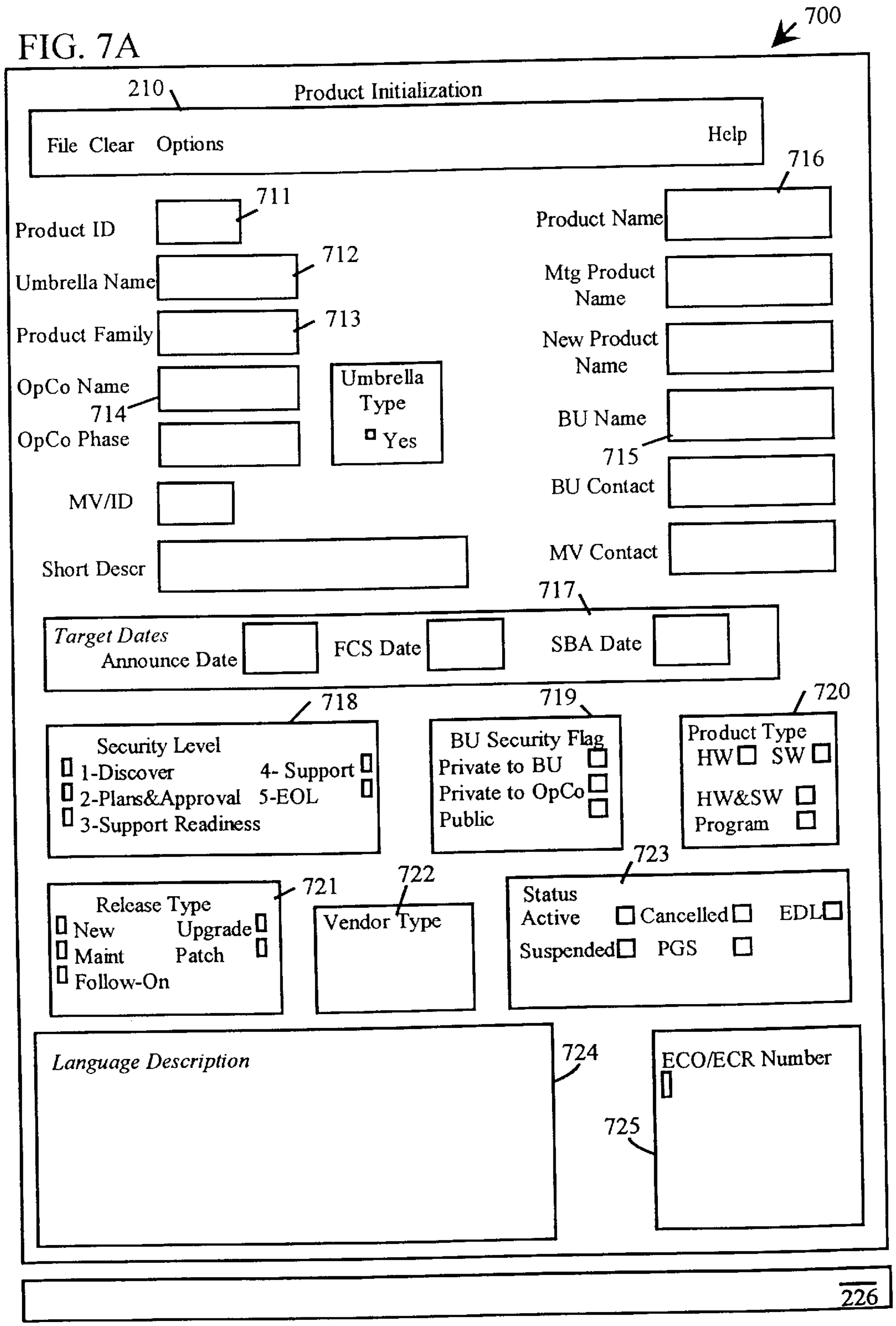

Product Initialization

File  Clear  Options                                      Help

Product ID [   ]                          Product Name [   ]
Umbrella Name [   ]                       Mtg Product Name [   ]
Product Family [   ]                      New Product Name [   ]
OpCo Name [   ]    Umbrella Type          BU Name [   ]
OpCo Phase [   ]   ☐ Yes                  BU Contact [   ]
MV/ID [   ]                               MV Contact [   ]
Short Descr [   ]

*Target Dates*  Announce Date [   ]  FCS Date [   ]  SBA Date [   ]

Security Level
☐ 1-Discover           4- Support ☐
☐ 2-Plans&Approval    5-EOL ☐
☐ 3-Support Readiness BU Security Flag
Private to BU     ☐
Private to OpCo   ☐
Public            ☐

Product Type
HW ☐  SW ☐
HW&SW ☐
Program ☐

Release Type
☐ New       Upgrade ☐
☐ Maint     Patch ☐
☐ Follow-On

Vendor Type

Status
Active ☐  Cancelled ☐  EDL ☐
Suspended ☐  PGS ☐

*Language Description*

ECO/ECR Number
☐

WORKFLOW PRODUCT NAVIGATION SYSTEM

BACKGROUND OF THE INVENTION

1. Reservation of Copyright

A claim of copyright protection is made on portions of the description in this patent document. The copyright owner has no objection to the facsimile reproduction by anyone of the patent document or the patent disclosure, as it appears in the Patent and Trademark Office patent file or records, but reserves all other rights.

2. Field of the Invention

The present invention relates to a graphical user interface (GUI) operative on a workstation or computer system. More specifically, the present invention relates to a GUI navigation system for navigating a list stored on a database in a network or computer system.

3. Description of the Related Art

Present-day computerized business systems typically include a number of computers or workstations connected in a network configuration and tied to a database. One of the tasks of the computerized business system is to supply information from the database to multiple system users so that the users can organize information from the database into a useful form. A substantial amount of planning is necessary to successfully market a product and information from the database supplies the foundation for this planning. Planning has become highly efficient through the usage of computerized systems for arranging database information in a useful format. Various procedures and techniques have continually improved the efficiency of planning. One system enhancement that has aided planning efficiency is the usage of database navigation systems for efficiently identifying and accessing useful information.

The production and marketing of a product typically requires skillful planning to achieve success in the marketplace. A useful planning tool is a product navigation system, which is typically called a workflow system. The product navigation system tracks all aspects of a product's introduction and sale including forecasting, design and development, production, marketing, sales and many others. Thus, product planning is highly complex and involves accessing the database to access highly diverse types of information.

One problem that arises in the usage of a product navigation system is the large amount and diversity of information that is to be arranged. What is needed is a technique for accessing a large number of very different types of information from a top-level viewpoint using an efficiently low number of selections or keystrokes.

Another problem that arises in the usage of a product navigation system is the large amount of information that must be entered to create a product record. What is needed is a method and system that reduces the work necessary to create a product record.

SUMMARY OF THE INVENTION

In accordance with the present invention, a workflow or product navigation system includes a single top-level screen which allows access to all aspects of the product information through selection of a single entry. The top-level screen includes a menu bar, a plurality of selectable icon push buttons in an icon area for directing inquiry to all aspects of the product information, and a product listing area. A user may select from several orderings of the icons to most efficiently access the product data. In particular, a preselected portion of the icons are arranged in a preselected order as determined according to a business unit default definition. The user may select an alternative user-defined selection and ordering of icons, or a list of all icons in a predefined, fixed order.

The icons on the top-level screen convey many details regarding the status of the product information. An icon, on its face, designates the user-access status of the information as read-write or read-only access. If a user has no access to information underlying the icon, no icon is displayed. An icon, on its face, expresses the data-content status of the information as being unfilled, copied from another source, or saved.

Many advantages are achieved by the described method and apparatus. One advantage is that all aspects of the product information are accessible through a single selection from a top-level screen. Another advantage is that the top-level screen includes alternative selections and arrangements of icons to allow a user-selectable subset of, for example, most-frequently used icons to be placed on the screen. It is advantageous that each icon has an overt appearance that, on its face, shows the status of the information accessed through the icon so that additional selections and pop-up screens need not be accessed to convey the information.

Another advantage is that the described system and apparatus allows for copying of information from one product listing to another. Copying of a screen from an existing product is useful because typically some information is the same in related products, allowing a substantial reduction in the amount of information entered during initialization of a new product.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

FIGS. 6A and 6B illustrate a respective schematic block diagram and a corresponding pictorial example of a screen presentation which show the contents of a product search display screen.

FIGS. 7A and 7B illustrate a respective schematic block diagram and a corresponding pictorial example of a screen presentation which show the contents of a new product initialization display screen.

DETAILED DESCRIPTION OF THE PREFERRED EMBODIMENTS

Figure 1:
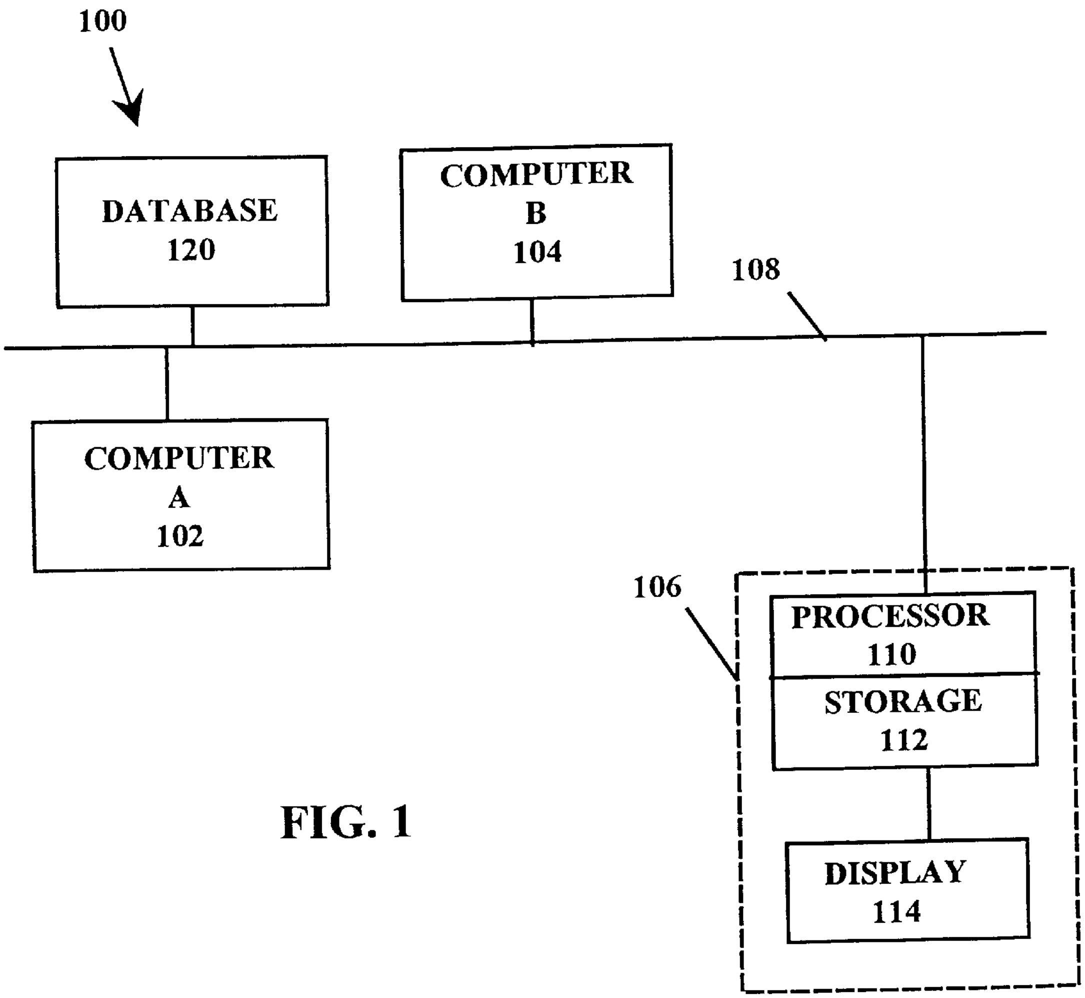
FIG. 1 is a block diagram which depicts a workstation or computer system hardware upon which is implemented a graphical user interface for navigating a product list stored on a database in accordance with one embodiment of the present invention.

Referring to FIG. 1, a block diagram shows an example of a network configuration upon which a graphical user interface is implemented for navigating a product list stored on a database in accordance with one embodiment of the present invention. The network configuration 100 includes a data storages such as database 120, and a plurality of workstations or computer systems such as a computer A 102, a computer B 104 and a computer 106 all connected by a network link, such as a local area network ("LAN") 108. A computer typically includes a processor 110 for executing software programs such as graphic display programs, a storage 112, and a display 114. The storage 112 may include a primary storage and a secondary storage. Typically a primary storage is embodied in various forms including dynamic RAM, static RAM, various types of read-only memory, flash memories and the like. A secondary storage may be embodied in various devices such as magnetic disk drives, hard disk drives, floppy disk drives, CD ROM drives, magnetic tape drives, cassette drives and the like.

In one embodiment, the product list navigation system z00 operates on a computer such as a Sun Microsystems workstation running a Solaris™ operating system version 2.4 or higher where Sun, Sun Microsystems, Solaris, and the Sun Logo are trademarks or registered trademarks of Sun Microsystems, Inc. in the United States and other countries.

Figure 2A:
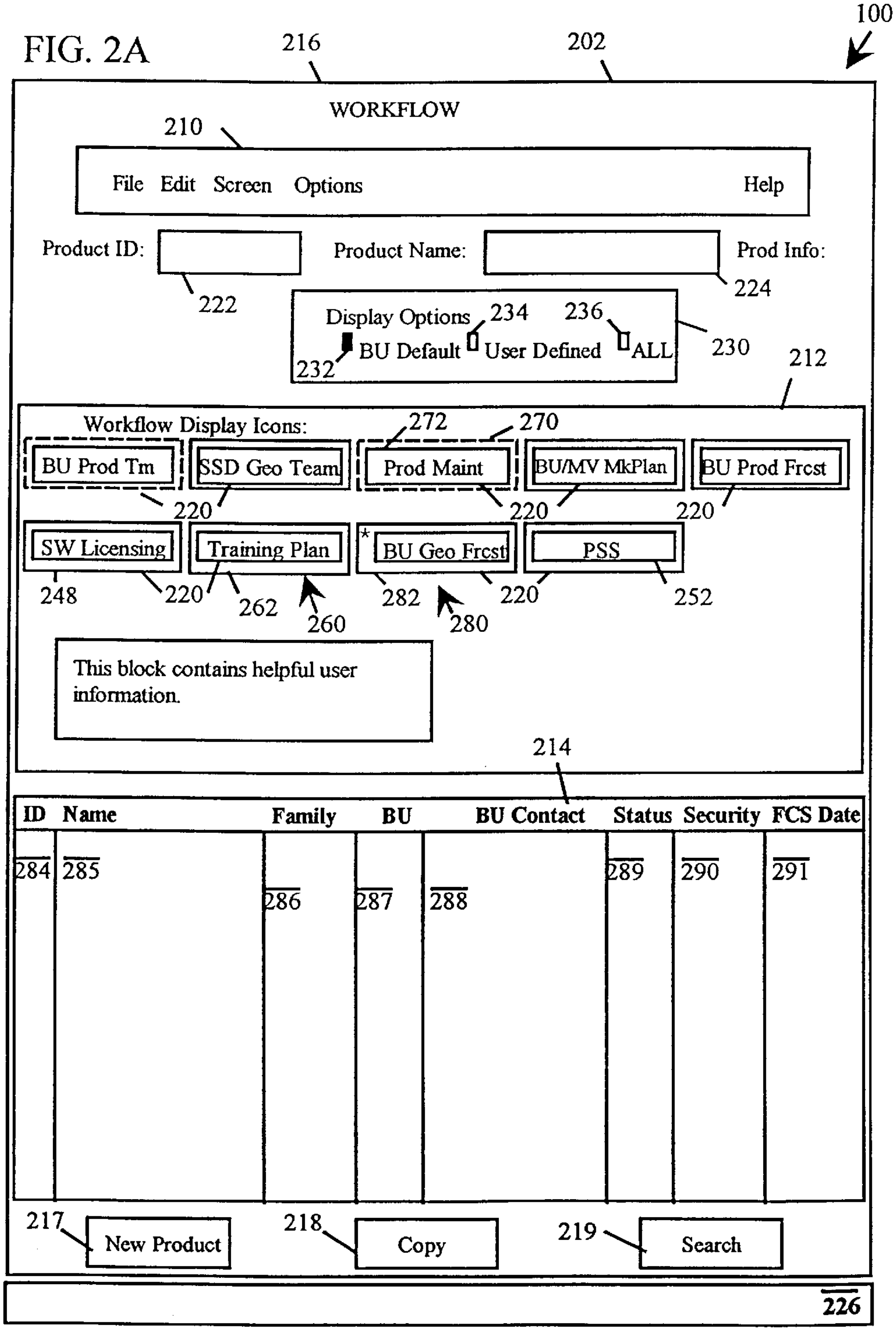
FIGS. 2A and 2B illustrate a respective schematic block diagram and a corresponding pictorial example of a screen presentation which shows the contents of a navigation system or workflow display screen in a business unit-defined configuration.
Figure 2B:
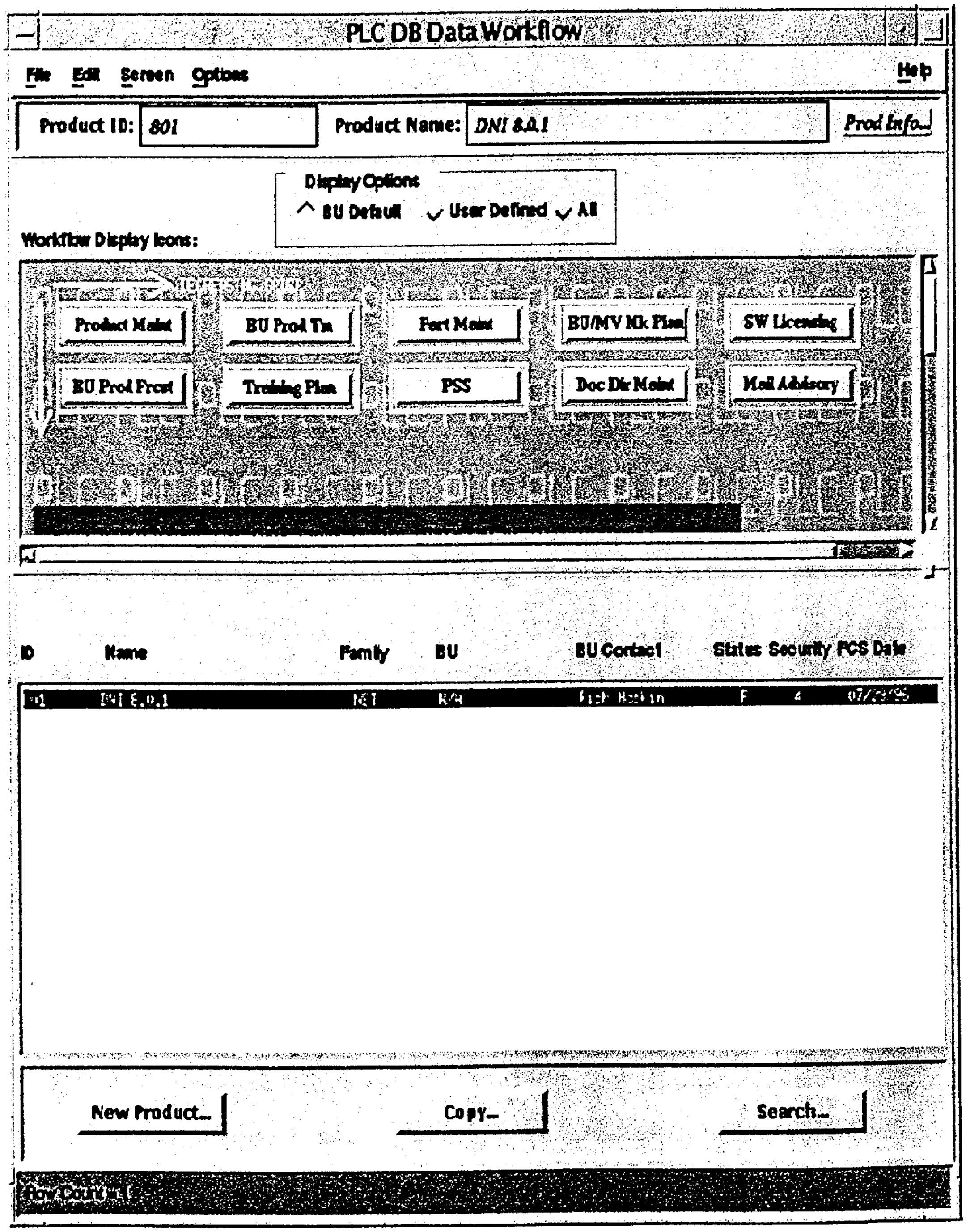

Referring to FIGS. 2A and 2B, a respective schematic block diagram and a corresponding pictorial example of a screen presentation illustrate the contents of a display screen of a navigation system. In the illustrative embodiment, the navigation system is a product list navigation system 200, which may also be called a Workflow navigation system. The general screen segments of a navigation screen 202 or Workflow screen, which are accessed during operation of the product list navigation system 200, include a menu bar 210, an icon area 212, and a product listing 214. The product list navigation system 200 assists a user in navigating a plurality of product lists by eliciting and receiving a user commands and selections in the screen segments of the navigation screen 202. In response to these commands and selections, the product listing 214 tabulates a list of products for which data are stored in a database. The products listed in the product listing 214 of a particular screen display are determined by the user request and the interactive exchange.

The menu bar 210 includes standard menu items including File, Edit, Screen and Options items which assist an interactive exchange with the user. The icon area 212 displays icons 220 in a predetermined order. The order of the icons 220 in the icon area 212 is predetermined or selected by the user. The icon display screen 212, on its face, displays the status of each product listing or icon display screen 212 that can be invoked by the icon display screen. Furthermore, the icon display screen 212, on its face, indicates the ability of the user to invoke a particular icon display screen without attempting to invoke the screen.

The icons 220 are used to select a product. When the user selects a product, a ChangeOpenWindows function is called which changes the contents of all open screens for the newly selected product. The state of all screens pertaining to the newly selected product are obtained and displayed on icons that are indicative of the limited read-only access, full read-write access and no access status of a particular screen.

The Options item of the menu bar 210 may be accessed to invoke an expert mode of operation of the product list navigation system. In the expert mode, a status bar at the base of the navigation screen 202 gives useful information, and displays warnings and error signals so that interruptions by annoying warning dialog windows are reduced.

A Product ID field 222 is finished for identifying a product by number. A Product Name field 224 supplies the product name of the product identified in the Product ID field 222.

The icon area 212 includes a plurality of push button icons 220. The order of icons 220 in an icon area 222 is from left to right and, if more than five icons are displayed, in multiple rows. Each push button icon 220 is associated with a particular pop-up display screen which is displayed upon activating the button by "clicking-on" the button.

In each icon area display screen 212, the icons 220 are selected for display in the icon area 212 and arranged in an order that is defined by a business unit or a user. In particular, the icon display selection and order are defined in accordance with one of three methods of definition including a business unit-defined method, a user-defined method, and a combined method. The user determines which ordering is invoked by selecting either a BU default item 232, a User Defined item 234, or an ALL item 236 within a Display Options field 230.

A business unit is a subunit within an operating company. Examples of a business unit include a networking group, an application development group, a marketing group, and a manufacturing group. In the business unit-defined method, each business unit can define a subset of all icons 220 and an order of display for the individual icons 220. A user is either granted or denied access to a particular icon 220. If a user has access to an icon screen or to an individual icon on a screen, then the icon screen and the icon are visible to the user. However, if a user is denied access to an icon 220, then that icon 220 is not made visible to the user. The business unit defines the icons in a fixed order. FIGS. 2A and 2B illustrate a navigation screen 202 in which the icons are predetermined in a fixed business unit order.

Figure 5:
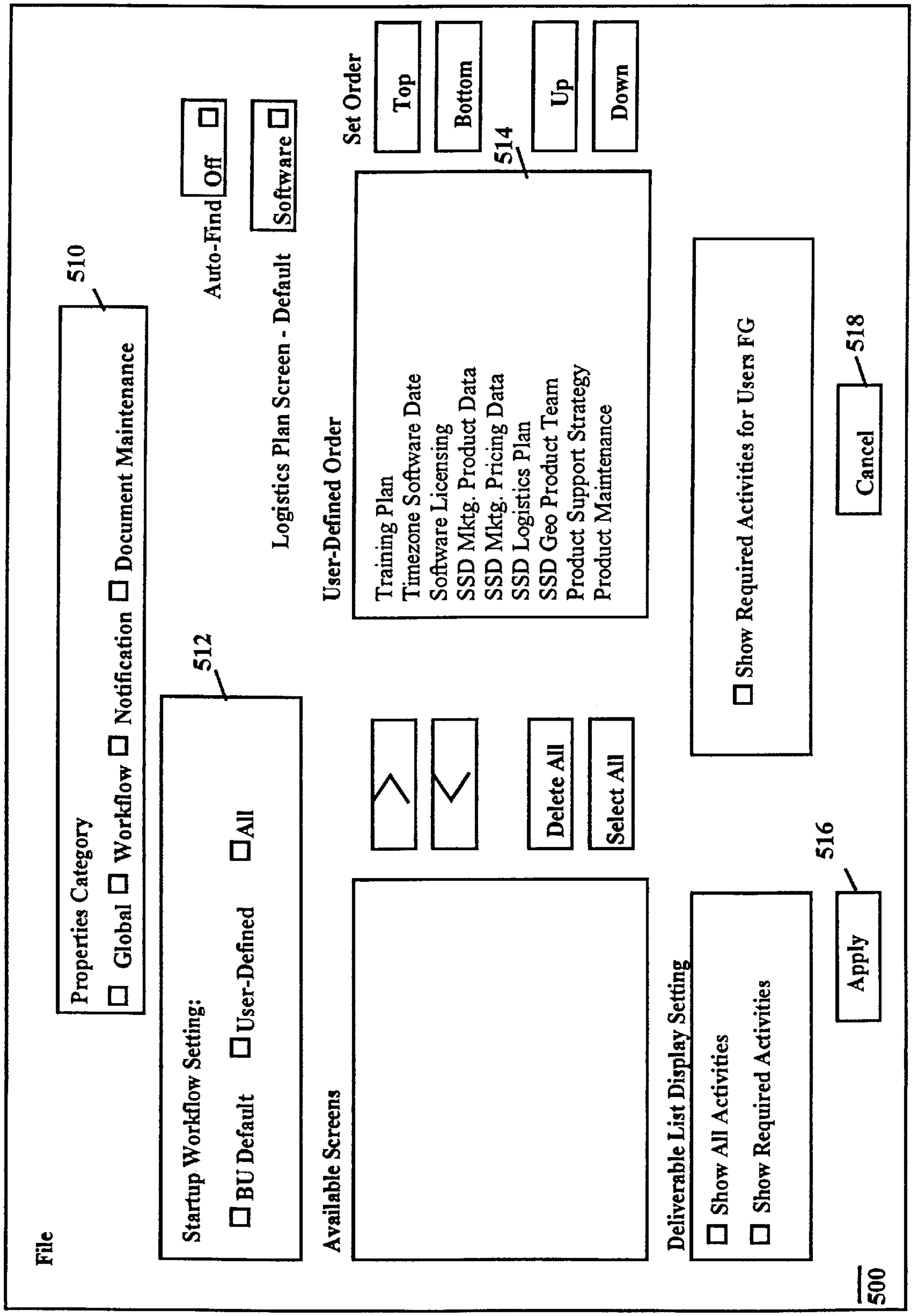
FIG. 5 is a block diagram which illustrates a screen representation of a properties setup screen.

For user-defined icons, the user defines the order and the selection of icons by setting navigation system properties, or Workflow properties, of the icons 220. The navigation system properties are set by invoking a property setup screen, for example through the Options item of the Menu Bar 210. A Workflow properties setup screen 500 is illustrated in FIG. 5.

The user can select for the user-defined icons only those icons that are most often used and place the selected icons in an order the user finds to be most suitable. Access to other icons, that are less often used, are then made by selecting either the BU or ALL options of the Display Options field 230.

Figure 3A:
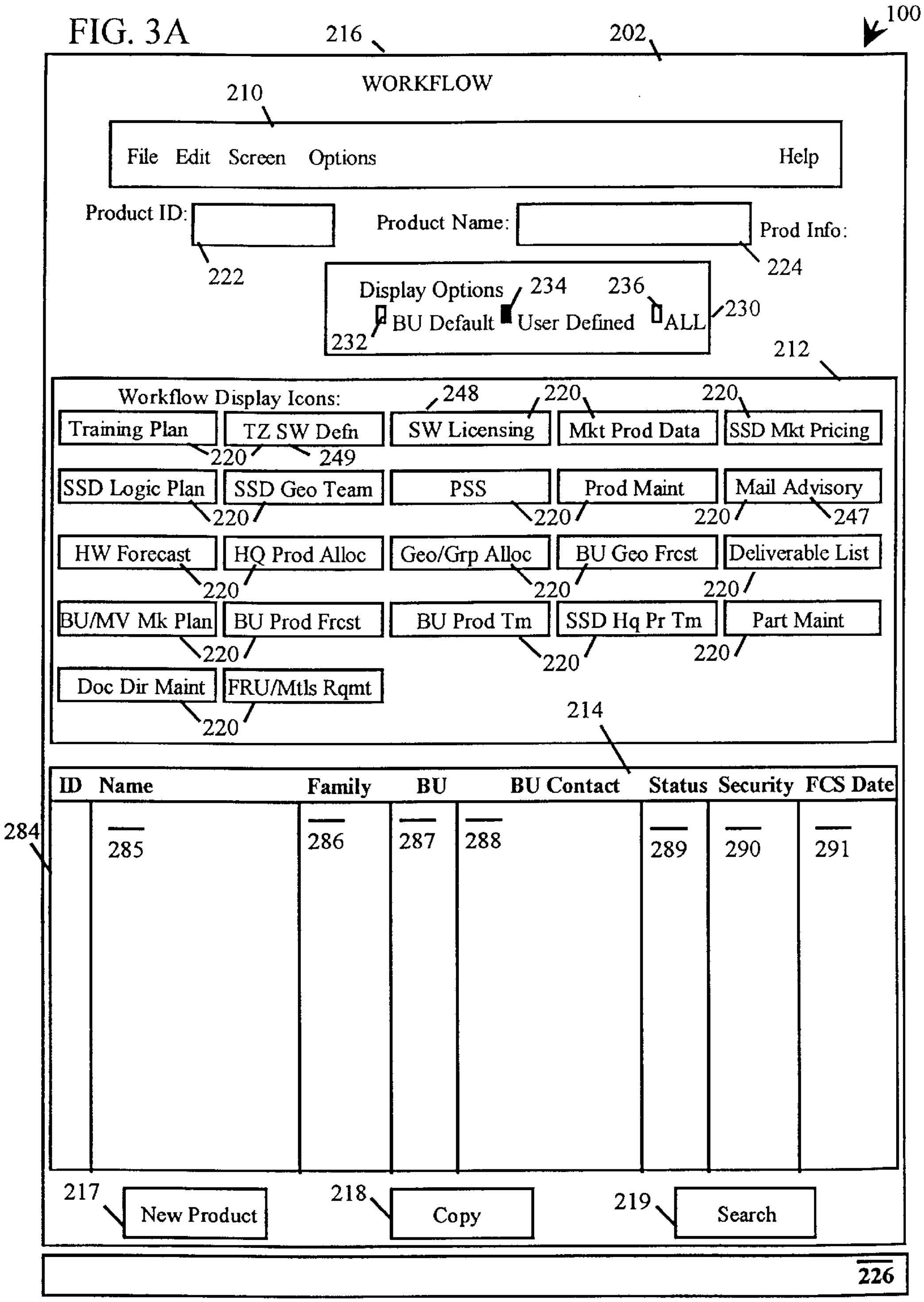
FIGS. 3A and 3B illustrate a respective schematic block diagram and a corresponding pictorial example of a screen presentation which shows the contents of a navigation system or workflow display screen in a user-defined configuration.
Figure 3B:
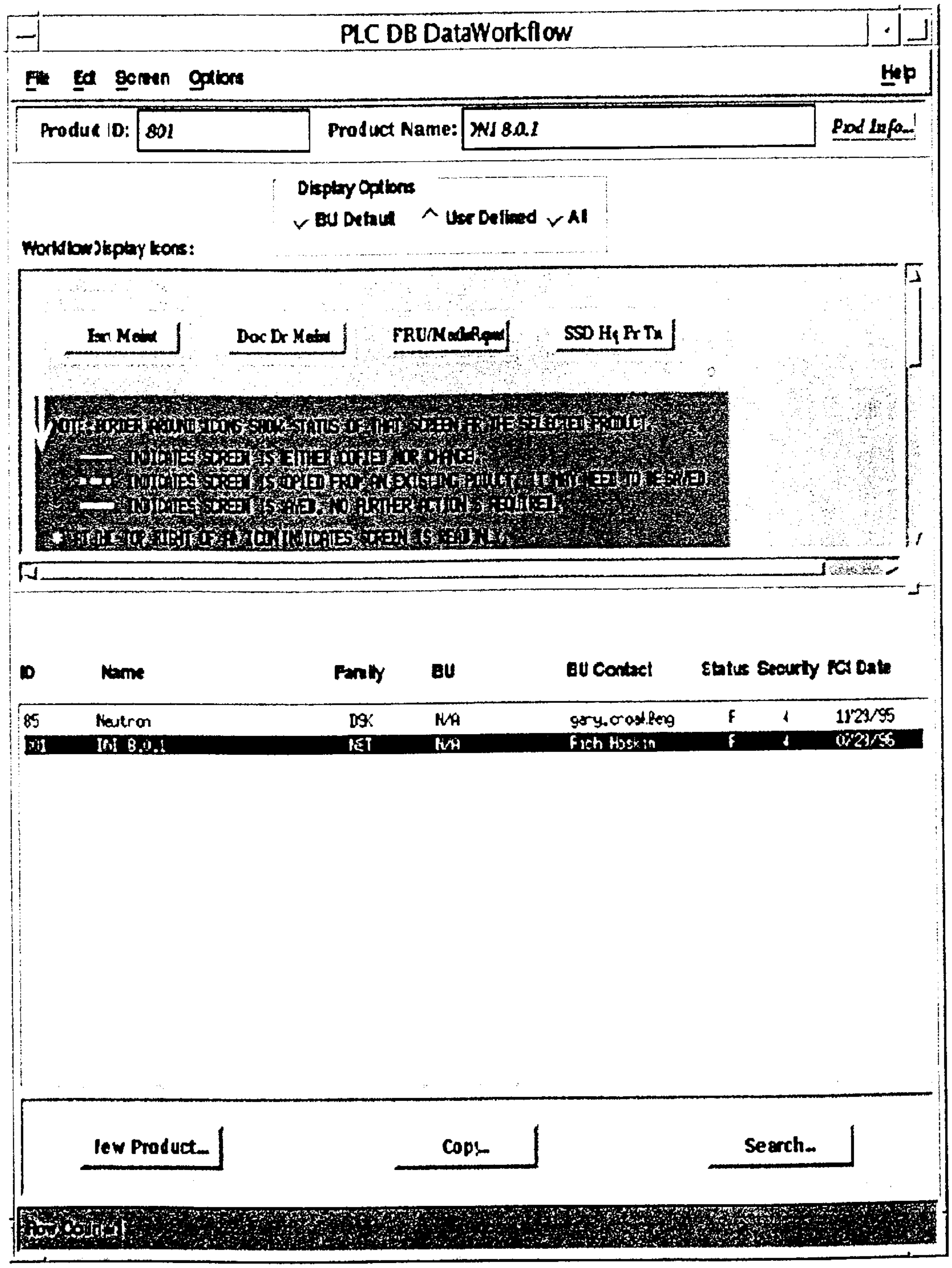

Although the business unit-defined icons have a fixed order, the user-defined order of the icons may be changed by the user at any time. The user has the option to select any icon and to modify the order of any selected icon. The user affirms a selected icon order by a entering a "save" command. The order is viewed subsequent to saving by selecting the Edit item on the Menu Bar 210 and selecting a RefreshIcon selection within the Edit item. Alternatively, the order is viewed using the Display Options field 230. FIGS. 3A and 3B illustrate a navigation screen 202 in which the icons are selected by the user in a user-defined order.

Figure 4A:
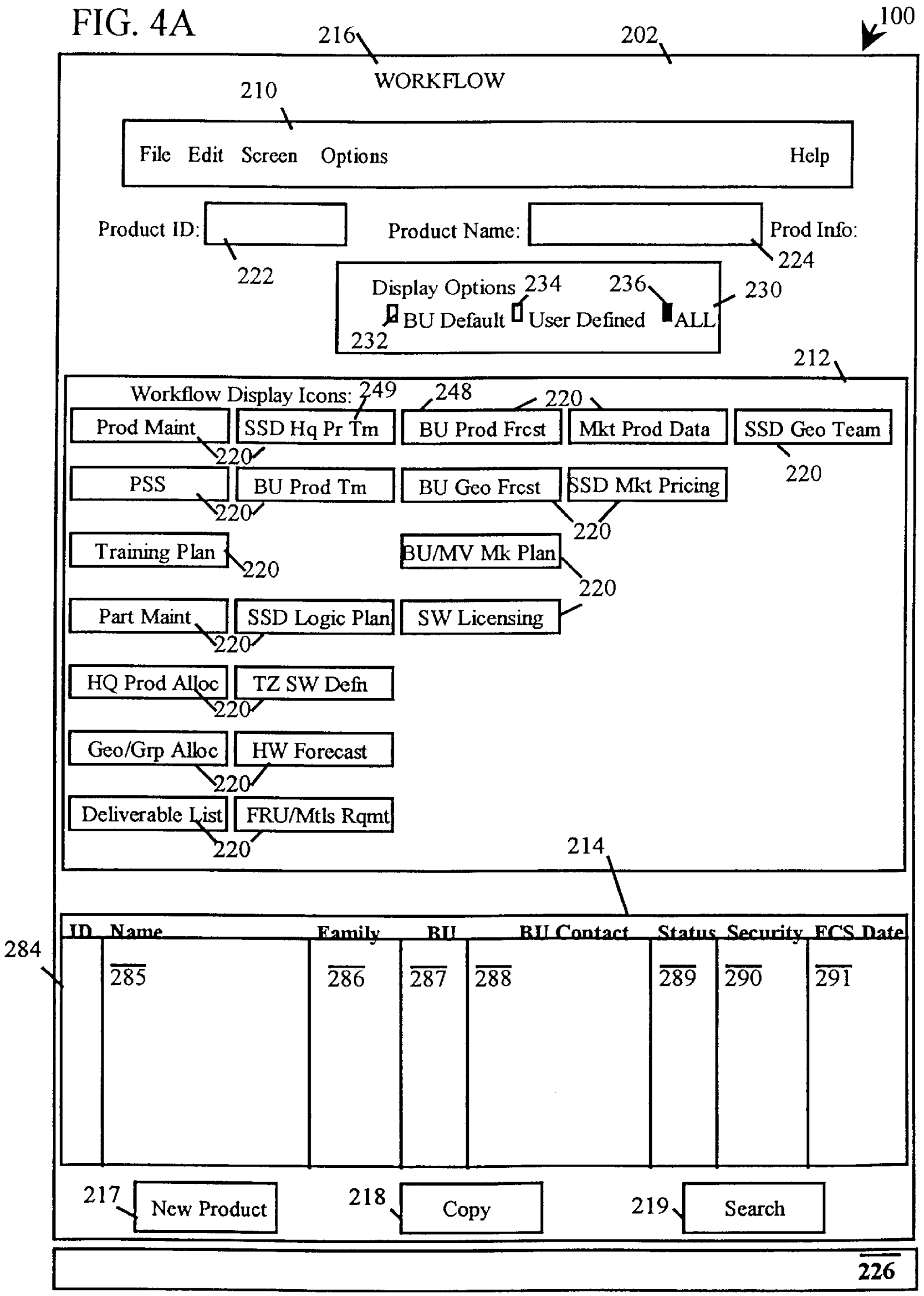
FIGS. 4A and 4B illustrate a respective schematic block diagram and a corresponding pictorial example of a screen presentation which shows the contents of a navigation system or workflow display screen in an ALL-inclusive configuration.
Figure 4B:
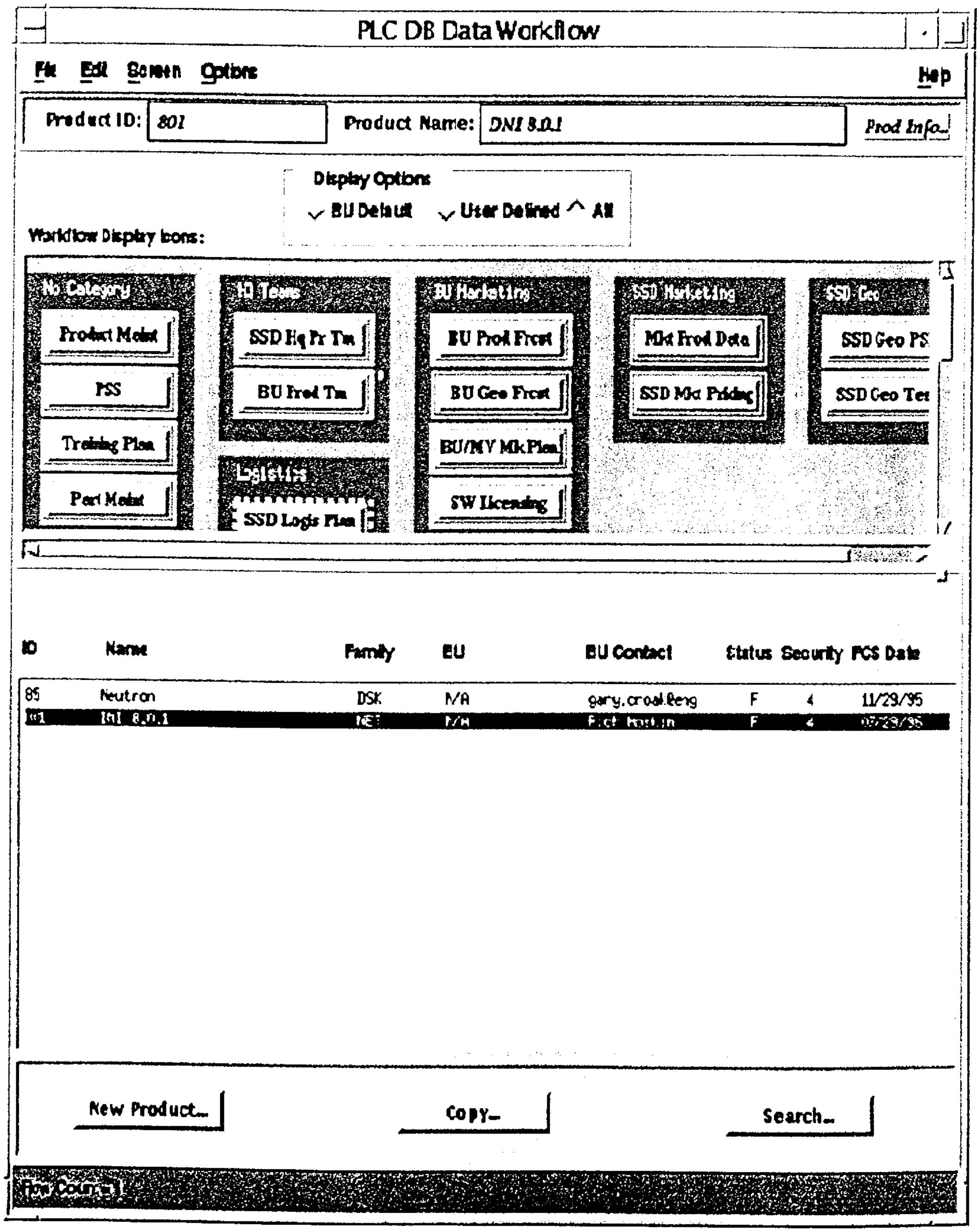

The user selects the combined method of defining icon order by specifying an "ALL" selection. The "ALL" selection causes the display of all icons for which the user has access. FIGS. 4A and 4B illustrate a navigation screen 202 in which the icons are placed in the combined "ALL" order.

The base of the navigation screen 202 includes a New Product push button 217, a Copy push button 218, and a Product Search push button 219. The New Product push button 217 is used to evoke a screen, shown in FIGS. 7A and 7B, which is used to set up a new product. The Copy push button 218 is used to evoke a screen, shown in FIGS. 8A and 8B, which copies information from an existing product data field into a new product data field, thereby reducing the amount of keying of possibly repetitive information. The Product Search push button 219 is used to interactively search for product data.

The icons 220 are grouped in related categories with relationships determined according to business unit and user selection. Icons which are not included in a particular category are grouped into a "No Category" group.

Each icon 220 is configured as a push button that is surrounded by a rectangular box 252. The thickness and style of the rectangular box 252 are indicative of the state of the particular screen accessed through the icon 220. The different states include an unfilled state, a copied state, and a saved state. The unfilled state is indicated by an unfilled state icon style 260 in which the surrounding rectangular box 262 is a thin solid line. In the unfilled state, the screen accessed through activation of the icon 260 is neither copied, changed nor filled. Icons are initially created in an unfilled state when a new product is created using the New Product push button 217.

An icon is copied by selecting the Copy push button 218. The copied state is indicated by a copied state icon style 270 in which the surrounding rectangular box 272 is a thick dashed line. In the copied state, the screen accessed through activation of the icon 270 is copied from an existing product so that the contents of the screen are an exact replica of the copied product, although the content of the screen is subject to modification, as needed. A new product is added to the database and a new icon and screen are created whenever a screen is copied. Copying of a screen from an existing product is useful because typically some information is the same in related products. Copying of information may allow a substantial reduction in the amount of information entered during initialization of a new product.

The saved state is indicated by a saved state icon style 280 in which the surrounding rectangular box 282 is formed from a thick solid line. In the saved state, the screen accessed through activation of the icon 280 is saved after creating a new product or copying from an existing product. The screen associated to a saved icon 280 has been modified at least once. An icon attains the "saved" state even when the screen data is only slightly modified and when new data is added to only a portion of the screen. For example, if a parts screen includes five different types of parts, the state is changed to a "saved" state if only a single part is modified or added to the screen.

The state of an icon 220 can be changed from unfilled to copied to saved. The state of an icon 220 can be changed from unfilled to saved. Once the state is changed to the saved state, the state becomes permanent.

Three types of access are defined between users and screens. A particular user can have limited read-only access, full read-write access or no access to a particular screen. If the user has full read-write access to a screen, a full access icon 280 is displayed. If the user has limited read-only access to a screen, a limited access icon 282 is displayed which includes a "*" displayed in the upper right corner of the icon 282. If a user has no access to a screen, then no icon is displayed.

Some screens are used for conveying information and are not applicable to a product type. The screen icons that evoke a screen display that is not applicable to a product type are insensitive and do not evoke a display screen. Examples of screens that are not applicable to a product type include, for example, a Mail Advisory icon 247, a Software (SW) Licensing icon 248, and a Timezone (TZ) Software (SW) Data icon 249.

The icons 220 include a "focus-in" action and a "focus-out" action. The focus-in action is activated by moving the cursor, which is typically manipulated using a mouse, into an icon and responds by displaying the complete database name of the screen to the right of the display options. The focus-out action is activated by moving the cursor away from the icon and responds by clearing the focus-in area.

The product listing 214 is a scrolled list that displays a list of products as directed by a user request and the interactive exchange via the icons and display screens. In the illustrative screen, the product listing 214 includes a Product ID number column 284, a Product Name column 285, a Product Family column 286, a Business Unit column 287, a Business Unit Contact column 288, a Status column 289, a Security Code column 290, and a First Customer Shipment (FCS) column 291. When the user selects a particular product entry in the product listing 214, the Product ID and Product Name are displayed in the Product ID field 222 and the Product Name field 224, respectively, in the navigation screen 202. Screens which are displayed by accessing other icons may have other information such as the names of persons who initiated a product, organizations or groups that have certain responsibilities regarding the product, standard applied to the product or product components, target dates of various events, forecast information and the like.

In addition to the user request and the icon-directed interactive exchange, the product listing is also filtered using a security filter which eliminates all products for which access is denied to the user. A first aspect of the security filter is assigned by designating a security level to a particular product and a security level to the users. A second aspect of the security filter is assigned by designating public products, products that are private to a business unit, and products that are private to an operating unit. An operating unit, or operating company (OpCo) is a group of business units.

A user has access to product lists in which the user's security level is greater than the security level assigned to a product. A user has access to all products that are assigned as public in all business units and that are assigned as private to an operating unit (OpCo) to which the user belongs, private to the business unit to which the user belongs, and private to user groups. Products having an assignment that is private to a user or users group are accessible only by the users or group of users that are granted the assignment. Products having an assignment that is private to a business unit are accessible only by users who are members of the business unit. Access outside these designations is denied.

Referring to FIG. 5, a block diagram illustrates a screen representation of a properties setup screen 500. Multiple properties screens are available to set up global, workflow, notification, and document maintenance screen properties through an entry made to a property category field 510. A product list navigation or workflow system is initially presented upon activation in one of the business user-defined, user-defined or ALL-inclusive display as directed by an entry made to a startup workflow setting field 512. The user-defined order is entered via a user-defined order field 514. Selected properties are implemented by selecting an apply field 516 or canceled by selecting a cancel field 518.

Figure 6B:
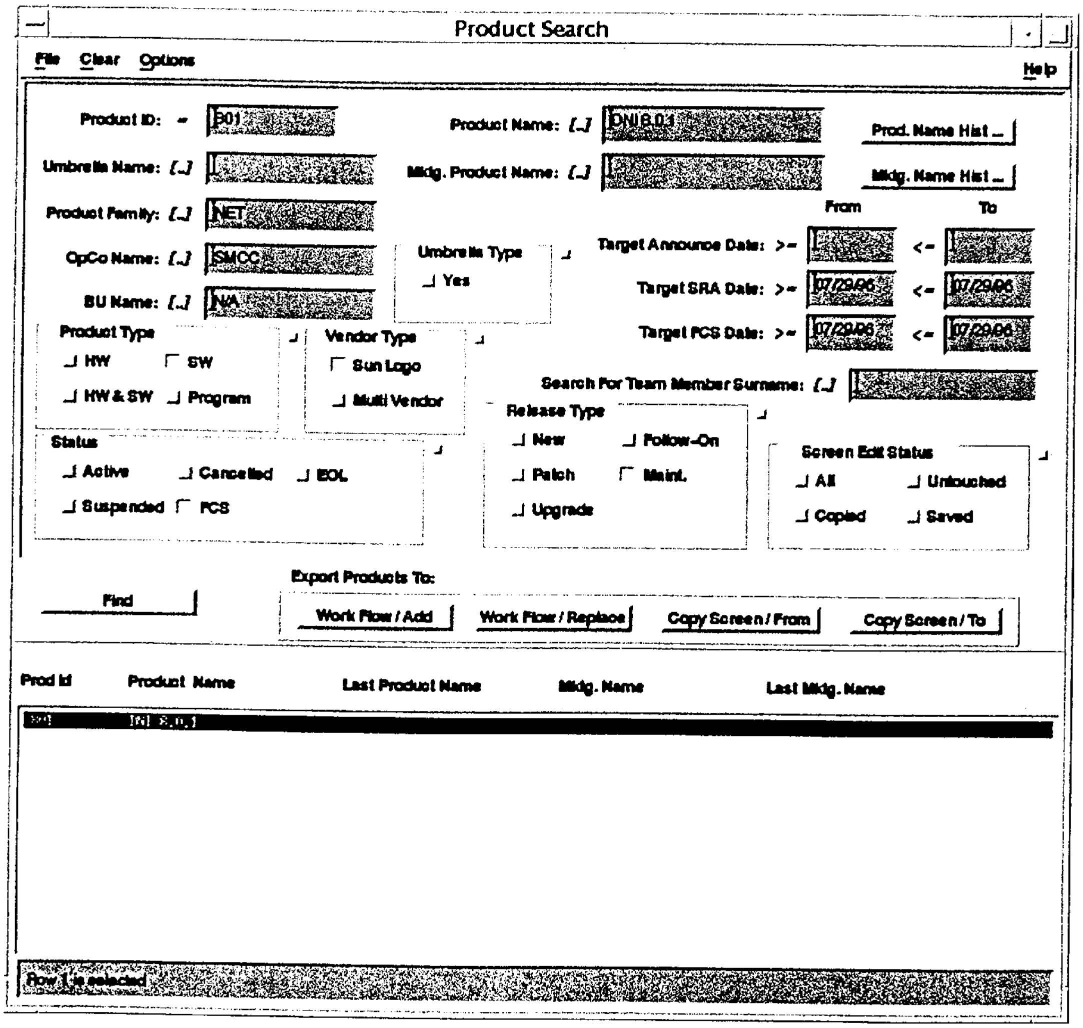

Referring to FIGS. 6A and 6B, a respective schematic block diagram and a corresponding pictorial example of a screen presentation illustrate the contents of a Product Search display screen 600 as displayed by the navigation system. A user searches for specific products based on several criteria contained in the Product Search Screen 600 and the result of that search may be imported into a product listing at the direction of the user. The user may direct that the imported portion of the product listing replace the existing list or be added at the front of the existing list. If the user does not save a product search screen, all products to which the user has access are displayed in the product listing 214.

The user uses the Product Search display screen 600 to search for product data by entering various search information into text fields and actuating a Find push button 610. The text fields include, for example, Product ID 611, Umbrella Name 612, Product Family 613, Operating Company Name 614, and Business Unit Name 615 fields. A particular text field setup, or query, is displayed in the workflow screen 202. The product list navigation system 200 responds by searching the database for product data. The user may then transfer the information to the data storage using an Export Control Area 220 which includes Add 622, Replace 624, Copy Screen From 626, and Copy Screen To 628 push buttons so that individual items may be replaced or added to the current screen or whole screens may be transferred.

Figure 7B:
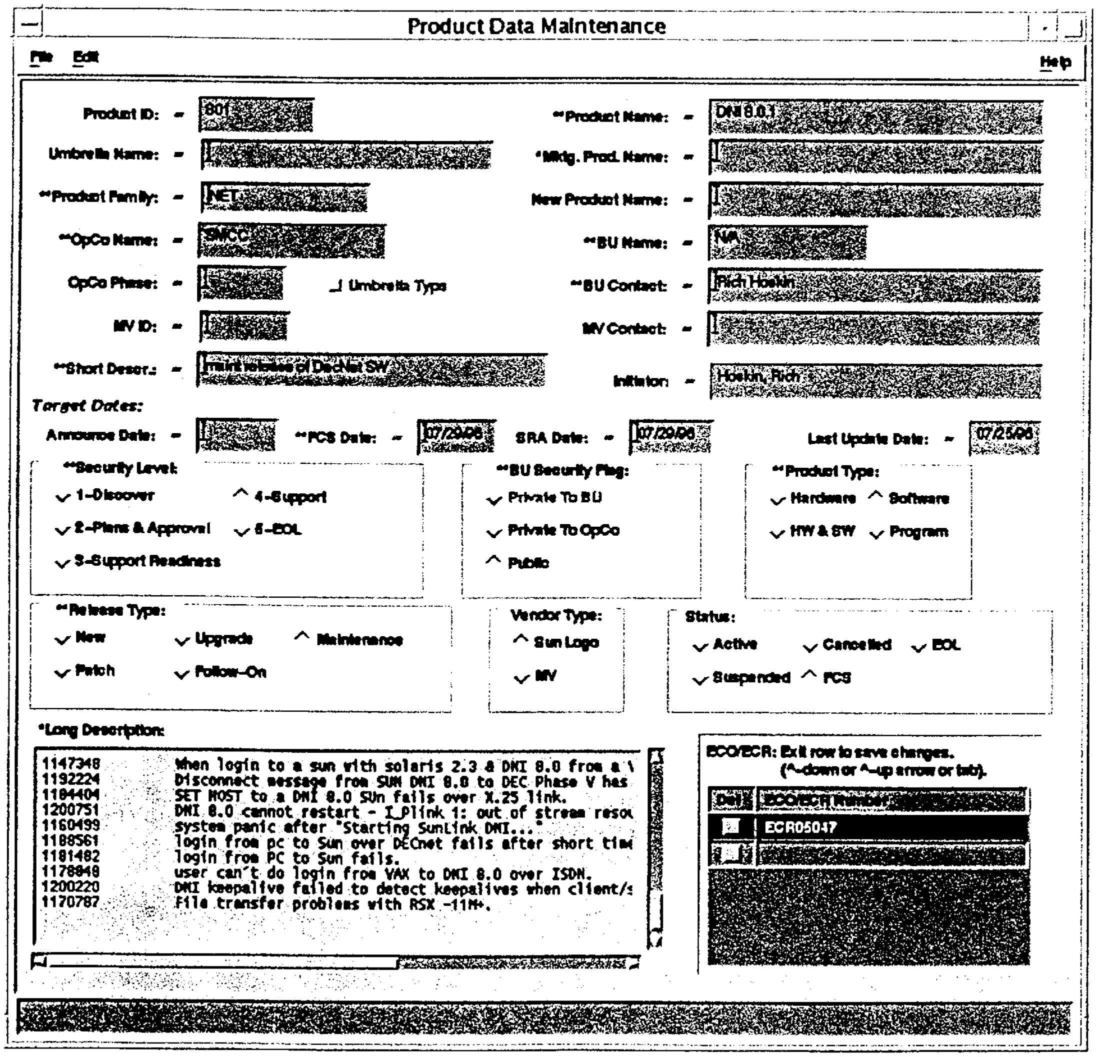

Referring to FIGS. 7A and 7B, a screen presentation 700 is shown which is evoked to initialize data for a new product. A user creates initialization data for a new product navigation screen by entering a product name into a product name field 716, product family information into a field 713, a business unit name into a business unit field 715, and other information. Target dates are entered into a target date field 717. A security level (field 718), a business unit security flag (field 719), a product type (field 720), a release type (field 721), a vendor type (field 722), and a status type (field 723) are also entered by the user. Boxes are also furnished for receiving a language description (block 724) and an ECO/ECR number (block 725).

Figure 8A:
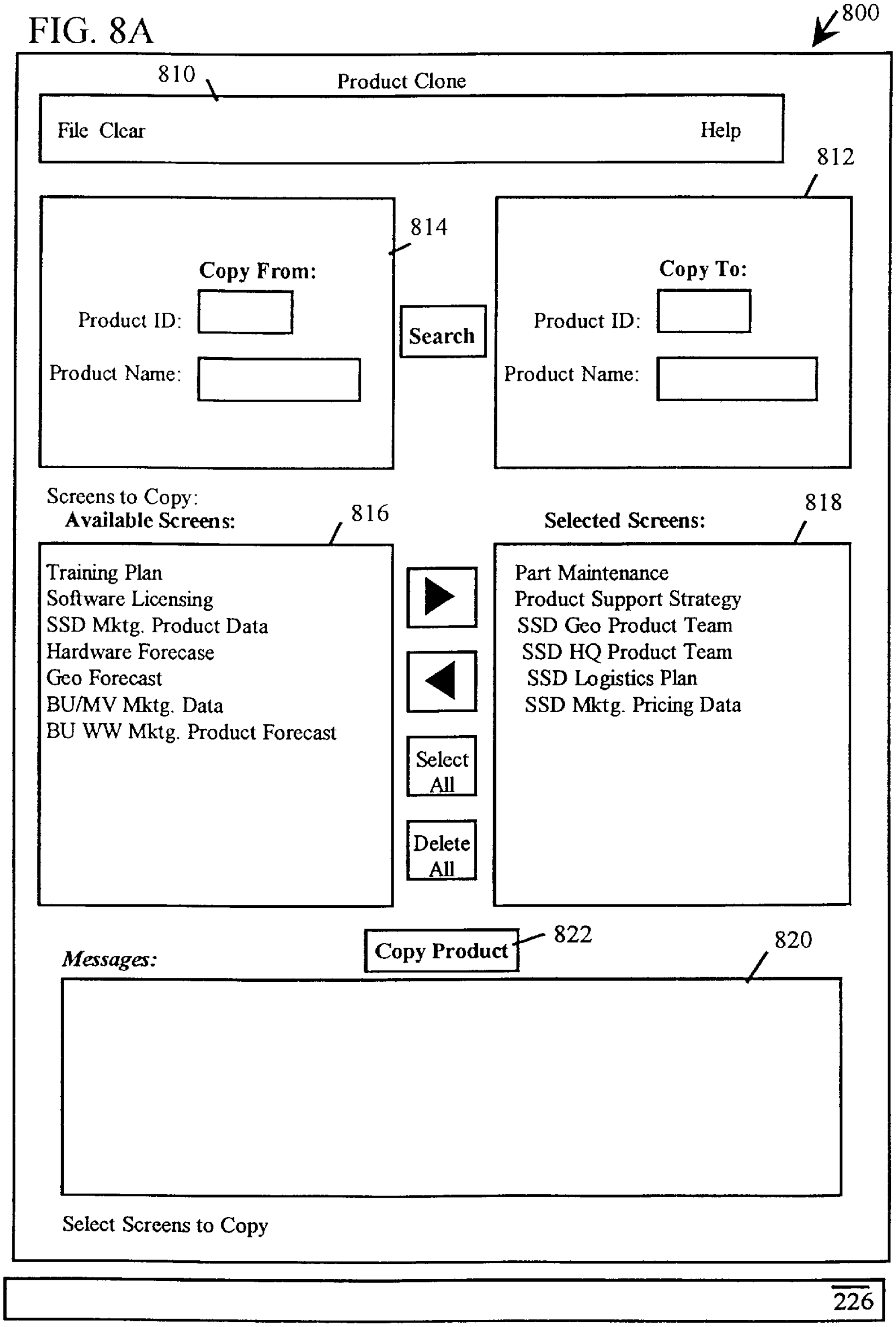
FIGS. 8A and 8B illustrate a respective schematic block diagram and a corresponding pictorial example of a screen presentation which show the contents of a product copy (product clone) display screen.
Figure 8B:
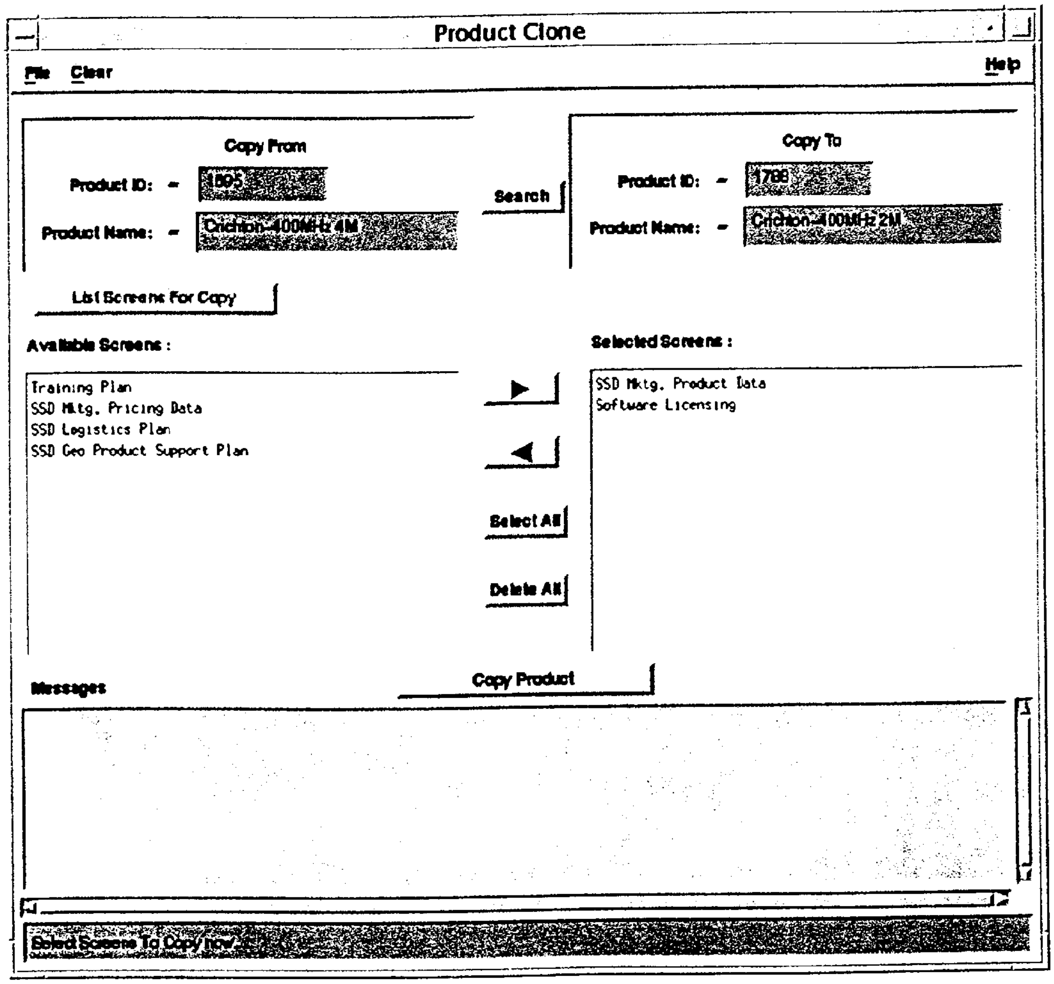

To avoid entering a substantial amount of information, a user may clone a display screen description from an existing related screen using a copy command. Referring to FIGS. 8A and 8B, a screen presentation 800 is shown which is evoked to "clone" a product description from an existing screen database. The product clone screen 800 includes a first product identifier block 814 for designating a source screen database which identifies the existing screen database and a second product identifier block 812 for designating a destination screen database for receiving data from the existing screen database. All of the screens of an existing database may be transferred or individual screens may be selected for copying using an available screens list 816 and a selected screens list 818. A copy product button 822 is selected to complete the copying of a screen database and create a copied product screen.

In an illustrative embodiment, the product list navigation system 200 is implemented using a standard Motif interface in which Motif library functions are implemented according to *OSF/Motif Style Guide, Version* 1.0. 1989. Cambridge, Mass.: Open Software. The Motif interface is used for performing most display functions including display widgets. A widget is an interface element such as a menu, a scrollbar, or a push button. In addition, the product list navigation system 200 uses the X Window System (Scheifler R. and Gettys J., *ACM Transactions on Graphics,* V63, 1986) including the Xlib graphics library for multiple purposes including the drawing of status lines, background and text.

Figure 9:
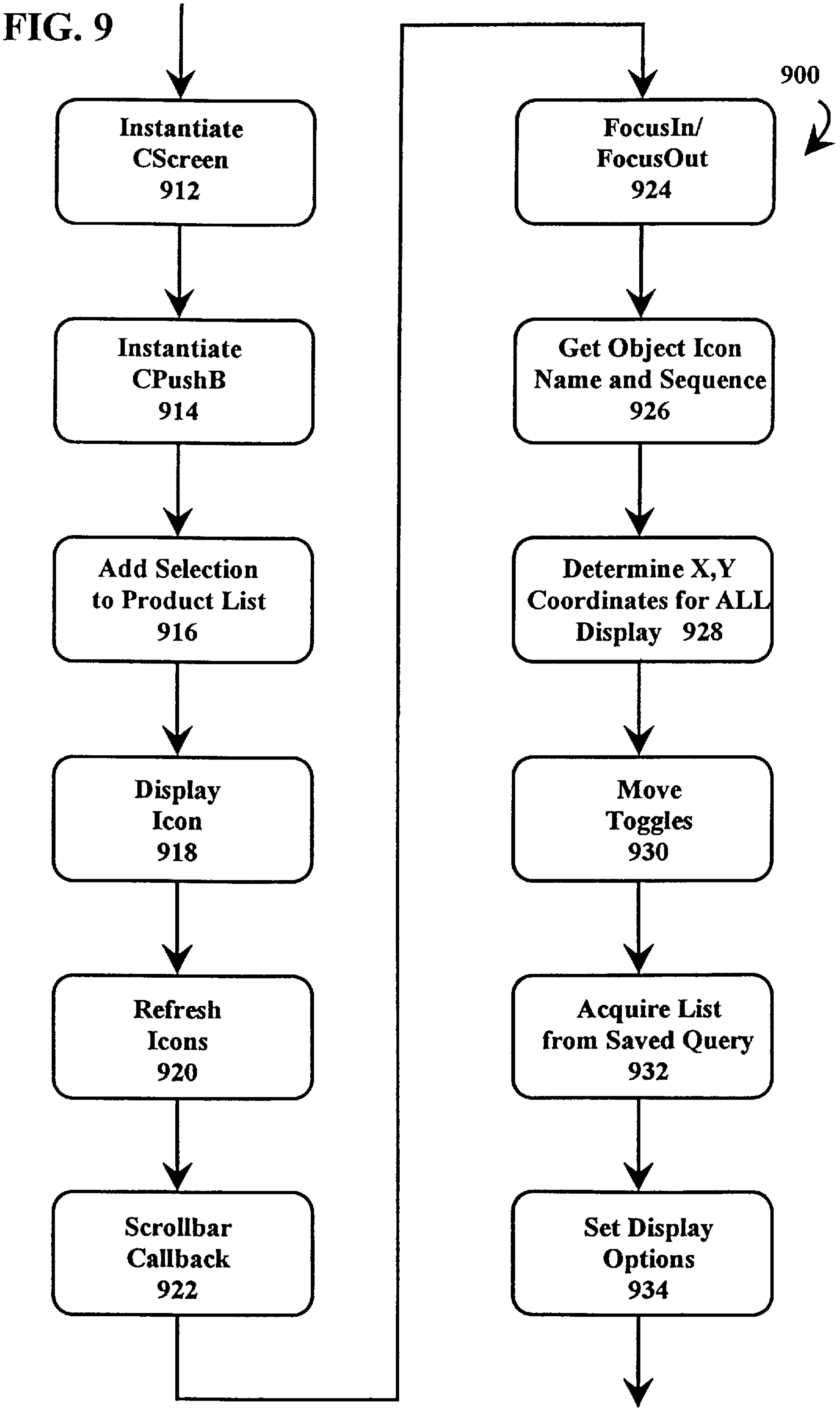
FIG. 9 is a flow chart showing the operation of a function PopupProc initialization routine which is called following creation of a product list navigation system interface.

FIG. 9 is a flow chart showing the operation of a function PopupProc 900. The function PopupProc 900 is an initialization routine which is called only once following the creation of the product list navigation system interface. In step 910 the function PopupProc 900 first allocates storage for a global pointer SafeStr which is used to hold an escape character for terminating operation of the product list navigation system and returning to operation of s system database. In instantiate Cscreen step 912, the function PopupProc 900 then creates an instance of the class Cscreen and stores the Cscreen object into a global display screen (Screen). In instantiate CpushB step 914, the function PopupProc 900 creates an array instance of the class CpushB, thereby setting a plurality of icons. Step 916 adds a selection callback function (ListSelectCb) to the product scrolled list.

Display icon step 918 adds an expose callback function (DrawingAreaExp) to the icon area. The icon area is a drawing area widget. Xlib is invoked to draw the status box around the icons, the "*" designation for limited read-only access, and the help text at the base of the Icon area. The expose callback function calls a RefreshIcons function 920 with an Unmanage attribute set to FALSE. Managed and unmanaged attributes are standard Motif technical terms which may be considered to respectively correspond to displayed icons and non-displayed (not accessible to a user) icons in the present implementation. The RefreshIcons function 920 draws the status lines around the icons and all X graphics. The RefreshIcons function 920 is called whenever the icon area is exposed, scrolled or a display option is selected. The RefreshIcon function 920 manages and unmanages the push buttons, which are a display manifestation of the icons, if the order of the icons is changed, otherwise only the icon graphics are drawn. As a result of the display icon step 918, whenever the drawing area window is exposed, all xlib graphics are redrawn.

The function PopupProc 900, in scrollbar callback step 922, adds a scrollbar callback function for all scrolling events currently on the scrollbar display. The scrolling event callback function calls the RefreshIcon function 920 so that, each time a user presses on the scrollbar of the icon area, the RefreshIcons function 920 is called with the Unmanage attribute set to FALSE.

The function PopupProc 900 adds focus actions in FocusIn/FocusOut step 924. Step 926 calls a PmGetScreenPerms function, which gets an object icon name, icon sequence, and icons access code as defined by a user in a UserObject data structure. The icon sequence is an order of icons, as designated by the user. The PmGetScreenPerms function converts the object icon name to an integer. The PmGetScreenPerms function acquires read and write access for each screen for the user, updates the individual screen class object, updates the "access" array of a Cscreen object, and receives the user's order to display icons. The icon object names that are used in the product list navigation system 200 are stored in a predefined IconObjectName array with each icon object name assigned a unique integer number. The access code and sequence number are stored in arrays by deriving a pointer into the arrays based on the converted object number. A GetObjectNumber function is called, which returns object numbers for all the screens in an array and returns a code if an object name is not found in the array. If an object name does not exist in a UserObject table, then the user does not have either read-only or read-write access to the icon object and, consequently, the associated icons in the Icon Area and in a "Screens" menu are destroyed. The PmGetScreenPerms function also calls a Screen->ConvertSequence function which stores all object numbers in the ascending order designated by the icon sequence into a separate UserOrder array. The PmGetScreenPerms function calls a Screen->CalcButtonPositions function which calculates the positions of the icons for the entered display option and stores the top x and y coordinate values in a DisplayOptionOrder buffer of the UserOrder array. In this manner, the CalcButtonPositions function sets fixed gaps between the icons. The first icons in all of the rows begin with the x and y coordinate position values defined in CScreen. The icon order and the icon x and y coordinate positions are fixed for a particular user and do not change when a different product is selected.

The function PopupProc 900 calls a GetBUOrder function in BUOrder step 926 which acquires a business unit-defined order for the business unit of the user from a table called BUObject. GetBUOrder function acquires a business unit-defined order for cases in which the currently defined BusinessUnitID is equal to the user's BusinessUnitID. If no rows are available for the user's BusinessUnitID, then an error code is substituted for the BusinessUnitID. The GetBUOrder function does not return a FALSE condition in case of this condition, since this condition is not designated a fatal error. If rows of the user's business unit do not exist in the BUObject table, then all of the icons that are accessible to the user are displayed in a predefined order based on the object numbers in the predefined IconObjectName array. If any icon object names having the user's business unit identification (BUId) exist in the BUObject table, then the object name is converted to an object number and the object number, which is indicative of the order of the icon in the icon sequence, is stored in a temporary array. Using a ConvertSequence function, the temporary array is subsequently converted to reorder the icons into a sequential order in a separate business unit icon array, called BUOrder. The ConvertSequence function reads a source array data including an object number and sequence pairs and writes the data into a destination array in ascending order of priority. The GetBUOrder function also calculates the x and y coordinate positions of the icons.

In AllOrder step 920, the function PopupProc 900 calls the Screen->CalcButtonPositions function designating an ALL__ORDER attribute so that the x and y coordinates of all the icons for the "ALL" display option are determined. A move toggles step 930 invokes the Rmanage function to remove the searchable toggle buttons to the right of the radio frames on the display screen. The PopupProc 900 function then calls an FillListFromSavedQuery function in step 932. The FillListFromSavedQuery function acquires the query made and saved by the user using the "Product Search" screen from a User table. In particular, the FillListFromSavedQuery function calls a GetProductListQuery function which acquires the user-saved portion of the Where clause. The GetProductListQuery function returns FALSE if a database retrieval or malloc fails and returns TRUE upon a successful operation. The saved query contains the WHERE clause or a NULL if the WHERE clause is not saved. Only the WHERE clause which designates the position at which the query is saved is stored in the User table. This Where clause is appended to a default query which includes all security conditions stored by a FillList function. The FillList function contains a user's saved query as designated by the Where clause when called from the PopupProc 900 function or contains a query from an imported product search. The query contained in FillList is concatenated to a default query. The default query includes the column names and the associated Where clause includes the pertinent security condition. The user's saved query or an imported query does not include the column names or security conditions. The FillList function then executes the query and receives data including Product Name, ProductFamily, BusinessUnitID, BusinessUnitContact, status code, and FirstCustomerShipment information for all products from a ProductCrossReference table. All of the information is concatenated and added to the scrolled list as one item.

In set display option step 934, a display option is set as chosen initially by the user. By setting the display option and the radio button, a callback function is automatically called. The callback function sets the x and y coordinates for the icons, acquires the screen status for the selected product and calls the RefreshIcons function 920.

Several functions are activated by selection of an item from the menu bar 210 including an ImportReplacementProductList function, an ImportAdditionalProductList function, and an AddToProductList function.

The ImportReplacementProductList function is activated when products are exported with a replacement option. All existing products, except a selected product, are removed from the product list and the exported products are appended after the selected product. If the selected product is in an imported products list, then the selected product is replaced with the new duplicated product without changing the position of the selected product so that the selected product always appears at the top of the product list.

The ImportAdditionalProductList function is activated when products are exported with an "Add" option and responds by adding the imported products to the top of the product list. If the product list previously contained any of the imported products, then a duplicated product is deleted from the initial position in the product list and the replacing imported product is added to the top of the product list maintaining the order of the previously added products. If any deleted item was previously selected, then the corresponding duplicate item is selected. As a result, the selected item changes position.

The AddToProductList function adds a product to the product list and is called under three conditions. In a first condition, AddToProductList function is called during initial loading of the products in which Motif library function parameter pos=0 so that the product list is appended at the end of the product list. In a second condition, AddToProductList function is called by the function ImportAddProductList with pos=0 to append a product to the product listing. In a third condition, AddToProductList function is called from a ProductIDataInitialization function when a new product is created with pos=1 so that the product entry is positioned at the first position in the product list.

Figure 10:
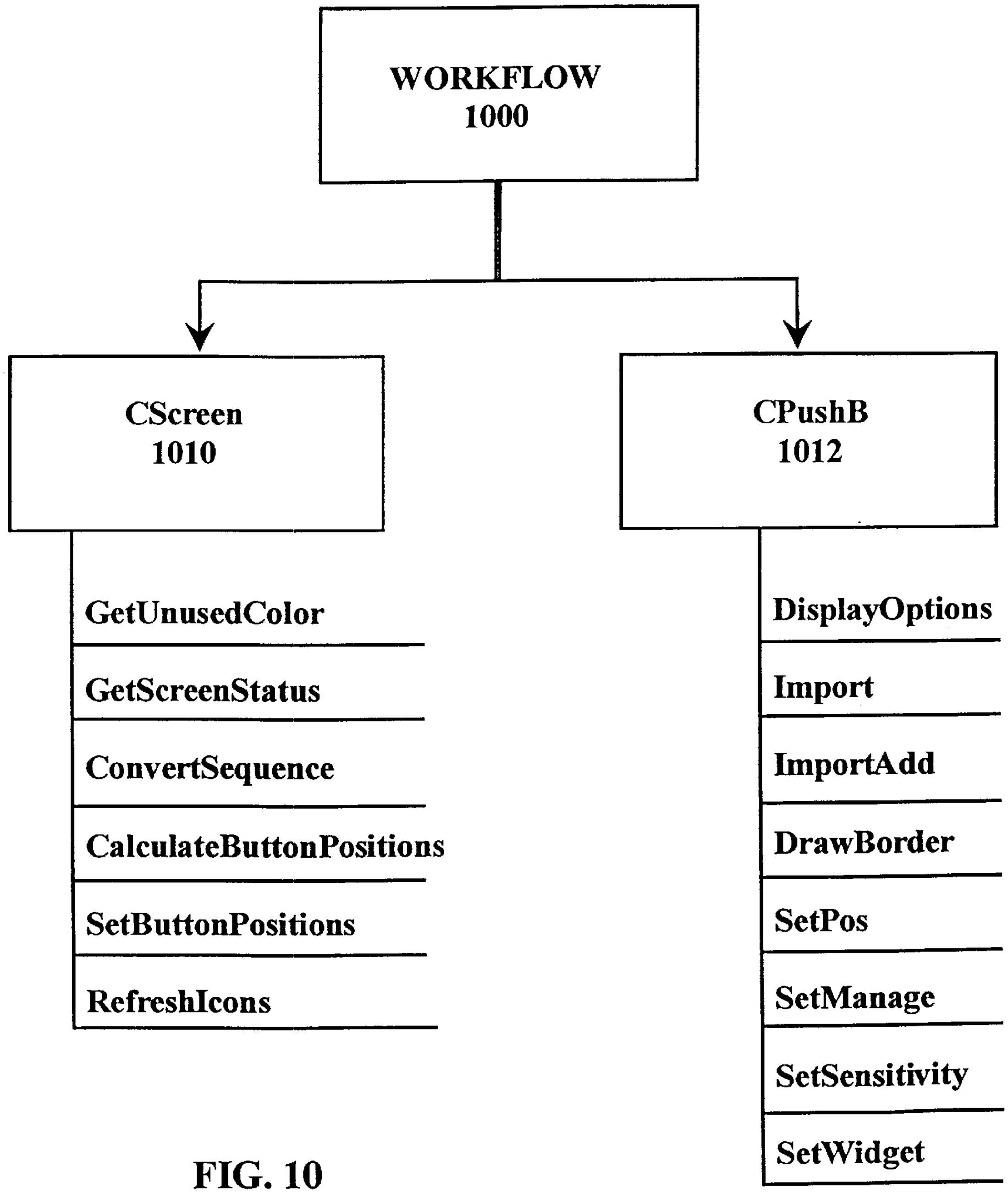
FIG. 10 is a block diagram showing class hierarchies of the product list navigation system.

Referring to FIG. 10, a class hierarchies of the product list navigation system 1000 for classes Cscreen 1010 and CpushB 1012. Classes Cscreen 1010 and CpushB 1012 are top-level classes which create objects which perform multiple functions.

Figure 11:
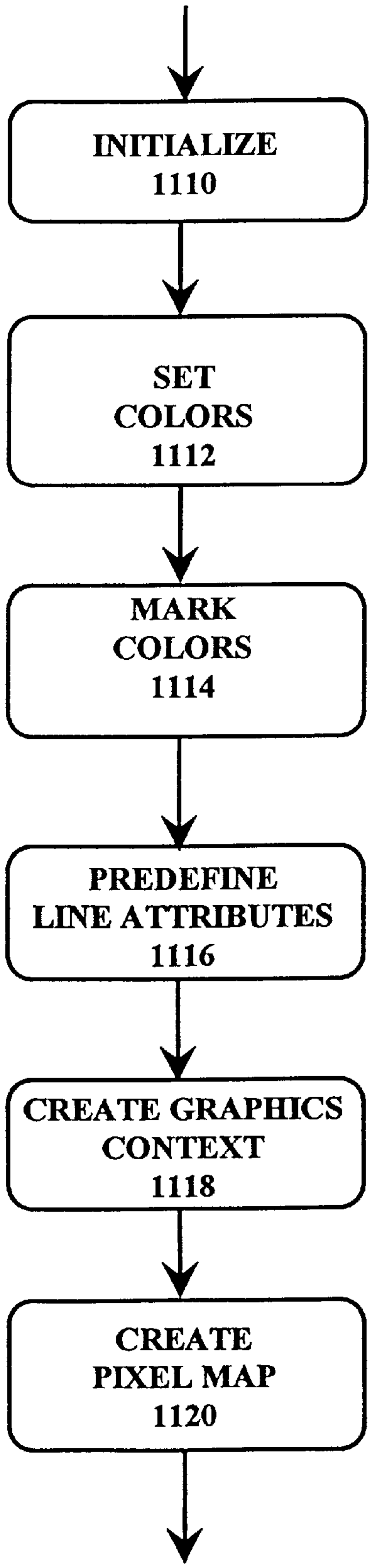
FIG. 11 is a flow chart of the methods performed by a Cscreen object.

Referring to FIG. 11, a flow chart of the methods performed by a Cscreen object are shown. The objects of the Cscreen class include two arrays including integer, access and status elements which store the access and status of each screen in the order defined by the array Objects. The first object in the array Objects is ProductMaintenance so that the access and status of ProductMaintenance are stored in the first elements of access and status.

A constructor Cscreen 1100, in initialize block 1110, initializes all arrays and all variables. In set colors block 1112, the constructor Cscreen 1100 gets a default colormap and allocates colors that are predefined in a ColorTable. A constructor is an operation that creates an object and/or initializes the state of the object. Four color names of the entries in the Color Table are utilized including colors assigned to status lines, a category background, a foreground color of a drawing area pixel map, and a background color of the drawing area pixel map. In a mark colors block 1114, the constructor Cscreen 1100 calls a GetUnusedColor function which acquires one of the colors allocated in the set colors block 1112 and marks the color as used so that, if the color is called again, a used color is not returned. In a line attributes block 1116, line attributes are predefined in a LineAttributes array which has three elements for the three states including unfilled state, copied state and saved state. The status line color pixel is stored in these elements. In the illustrative embodiment, a single color is used for all states. A create graphics context block 1118 creates a graphics context and sets the foreground and background colors for drawing graphics. A create pixel map block 1120 creates the pixel map and set s the pixel map as a tile in the drawing area of the display.

Cscreen methods include the GetUnusedColor function, a GetScreenStatus function, a ConvertSequence function, the CalculateButtonPositions function, the SetButtonPositions function, and the RefreshIcons function.

The GetUnusedColor function returns an unused color pixel from an array of preallocated color pixels and marks the returned array element as USED. The GetUnusedColor function also returns a −1 if no unused color pixels are found or if a “color” property is set to “no color”.

The GetScreenStatus function acquires the status of all screens associated to a specified ProductID and fills a status buffer with the acquired status information.

The ConvertSequence function reads a source array data including an object number and icon sequence pairs in an unknown order. The object number is set according to the user-defined or business unit-defined icon order. The ConvertSequence function converts the source array to a destination array in a priority order and presents the converted data so that the first element of the destination array has a top priority, a second element has a second priority and so forth. All objects in the source array for which the user has no access are not converted and entered into the destination array.

The CalculateButtonPositions function calculates the upper left x and y positions for each accessible button for a specified order of icons. All positions for all icon orders are calculated first and stored in Cscreen because these positions do not change with product selection. When a new product is selected, the RefreshIcons function should only refresh the status in the rectangular box enclosing the accessible icon push buttons unless a user changes the display options. When the display options are changed, the icon push buttons are set to an unmanaged state, moved to a selected position, and then set to a managed state.

The SetButtonPositions function sets the position for the icon push buttons from a stored array. The positions of the push buttons are set depending on the selected icon order. The order is selected to be either the business unit-defined order, the user-defined order, or the combined (ALL)-defined order.

The RefreshIcons function refreshes the displayed icons. If the unmanaged bit is set, the most recent data is retrieved from a database. All icons are unmanaged and only required icons are managed to reflect the content of the current database. An icon is required if the icon order is a user-defined order and the icon is selected by the user. If the umnanaged bit is cleared, then the RefreshIcons function is called from scrollbar callbacks so that neither accessing of the database or unmanaging and managing the icons are necessary.

Referring again to FIG. 10, a block diagram shows methods performed by a CpushB object. The CpushB class contains a widget Handle, a TopLeftCornerPosition which designates the position of an icon push button and an IconActive designator. The CpushB class also includes two static variables for holding the width and height of a push button. CpushB class further includes a CpushB array which has a constant NUMSCREENS instances, each instance representing one icon. The arrays BusinessUnitOrder, UserOrder and AllCat store information relating to the position of the icons.

CpushB methods include functions including DisplayOptions, Import, ImportAdd, DrawBorder, SetPos, SetManage, SetSensitivity, and SetWidget.

The DisplayOptions function acquires the most recent status of the screen for a designated product, sets positions for the icon push buttons depending on the display options, and displays the icons.

The Import function replaces an existing product list with new products that are generated in response to a query. Only the previously selected product is retained at the top of the product list.

The ImportAdd function adds new products generated in response to a query to an existing product list. All products are added at the top of the product list. If a new product identifier (ProductID) already exists on the product list, then the old product is deleted after adding all new ProductIDs.

The DrawBorder function draws the status display in the rectangular graphic enclosing an icon. Attributes of the status border including color, style (solid or dash), and line thickness are stored in a preset array, LineAttrs.

The SetPos function calls a Motif function to set a position at which an icon push button is to be displayed.

The SetManage function calls a Motif function to make the icon push button either visible or invisible.

The SetSensitivity function calls a Motif function to enable or disable the sensitivity of an icon push button.

The SetWidget function sets a WidgetHandle into a preallocated widget variable.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems which utilize Xlib and Motif to implement the product navigation system. In other embodiments, other graphics libraries and systems may be used or the product navigation system may be constructed without using a graphics library.

What is claimed is:

1. A method for a workflow navigation system for navigating a database and displaying a list of a plurality of database entries comprising:

presenting on a display device a plurality of items to assist an interactive exchange with a user, including:

a first input field for specifying a product identification number, a second input field for displaying a product name, a third input field for specifying a display order of a plurality of workflow display icons in one of a predetermined order and a user defined order, an icon area for displaying the plurality of workflow display icons according to the specified order, the icon area being indicative of a status of each product in the list and accessibility to a particular icon display screen, and a product listing area for displaying a list of products for which data are stored in the database, and navigating the database by interacting with the displayed plurality of items.

2. A method according to claim 1, further comprising:

deriving the list via a sequence of interactions between the user and the database.

3. A method according to claim 1, further comprising:

presenting, by a appearance of the workflow display icons, a status of the display screen indicated by an icon, the status of the screen including the status of unfilled, copied, and saved.

4. A method according to claim 1, further comprising:

presenting, by an appearance of the icons, a status of the display screen indicated by the icon, the access of the screen to the user including the accesses of read-write, read-only, and no access.

5. A method according to claim 1, wherein the list is a product list.

6. A method according to claim 1, further comprising:

deriving the list via a sequence of interactions between the user and the database, and filtering the list using a security filter which eliminates list element for which the user is denied access.

7. A method according to claim 1, wherein the predetermined order of the plurality of workflow display icons is selected from a business unit order, a user-specified order, and an ALL-inclusive order.

8. A system for a workflow navigation system for navigating a database and displaying a list of a plurality of database entries comprising:

a computer system coupled to the database and including a processor coupled to a storage and a display device coupled to the processor;

a program code executing on the processor and including:

a routine for presenting on a display device a plurality of items to assist an interactive exchange with a user, including:

a first input field for specifying a product identification number, a second input field for displaying a product name, a third input field for specifying a display order of a plurality of workflow display icons in one of a predetermined order and a user defined order, an icon area for displaying the plurality of workflow display icons according to the specified order, the icon area being indicative of a status of each product in the list and accessibility to a particular icon display screen, and a product listing area for displaying a list of products for which data are stored in the database, and a routine for navigating the database by interacting with the displayed items.

9. A system according to claim 8, wherein the program code further comprises:

a routine for deriving the list via a sequence of interactions between the user and the database.

10. A system according to claim 8, wherein the program code further comprises:

a routine for presenting, by an appearance of the workflow display icons, a status of the display screen indicated by an icon, the status of the screen including the status of unfilled, copied, and saved.

11. A system according to claim 8, wherein the program code further comprises:

a routine for presenting, by an appearance of the workflow display icons, a status of the display screen indicated by the icon, the access of the screen to the user including the accesses of read-write, read-only, and no access.

12. A system according to claim 8, wherein the list is a product list.

13. A system according to claim 8, wherein the program code further comprises:

a routine for deriving the list via a sequence of interactions between the user and the database, and a routine for filtering the list using a security filter which eliminates list elements for which the user is denied access.

14. A system according to claim 8, wherein the predetermined order of the plurality of workflow display icons is selected from a business unit order, a user-specified order, and an ALL-inclusive order.

15. A method of providing a workflow navigation system for navigating a database and displaying a list of a plurality of database entries comprising:

providing a computer system coupled to the database and including a processor coupled to a storage and a display device coupled to the processor;

providing a program code executing on the processor and including:

a routine for presenting on a display device a plurality of items to assist an interactive exchange with a user, including:

a first input field for specifying a product identification number, a second input field for displaying a product name, a third input field for specifying a display order of a plurality of workflow display icons in one of a predetermined order and a user defined order, an icon area for displaying the plurality of wotkflow display icons according to the specified order, the icon area being indicative of a status of each product in the list and accessibility to a particular icon display screen, and a product listing area for displaying a list of products for which data are stored in the database, and a routine for navigating the database by interacting with the displayed items.

16. A method according to claim 15, wherein the program code further comprises:

a routine for deriving the list via a sequence of interactions between the user and the database.

17. A method according to claim 15, wherein the program code further comprises:

a routine for presenting, by an appearance of the workflow display icons, a status of the display screen indicated by an icon, the status of the screen including the status of unfilled, copied, and saved.

18. A method according to claim 15, wherein the program code further comprises:

a routine for presenting, by in appearance of the workflow display icons, a status of the display screen indicated by the icon, the access of the screen to the user including the accesses of read-write, read-only, and no access.

19. A method according to claim 15, wherein the program code further comprises:

a routine for deriving the list via a sequence of interactions between the user and the database, and a routine for filtering the list using a security filter which eliminates list elements for which the user is denied access.

20. A method according to claim 15, wherein the predetermined order of the plurality of workflow display icons is selected from a business unit order, a user-specified order, and an ALL-inclusive order.

21. An article of manufacture comprising:

a non-volatile storage;

a plurality of instructional sections stored in the non-volatile storage, the instructional sections providing a graphical user interface (GUI) application for a workflow navigation system executable on a computer system, the GUI application comprising:

a routine for presenting on a display device a plurality of items to assist an interactive exchange with a user, including:

a first input field for specifying a product identification number, a second input field for displaying a product name, a third input field for specifying a display order of a plurality of workflow display icons in one of a predetermined order and a user defined order, an icon area for displaying the plurality of workflow display icons according to the specified order, the icon area being indicative of a status of each product in the list and accessibility to a particular icon display screen, and a product listing area for displaying a list of products for which data are stored in the database, and a routine for navigating the database by interacting with the displayed items.

22. An article of manufacture according to claim 21, wherein the program code further comprises:

a routine for deriving the list via a sequence of interactions between the user and the database.

23. An article of manufacture according to claim 21, wherein the program code further comprises:

a routine for presenting, by an appearance of the workflow display icons, a status of the display screen indicated by an icon, the status of the screen including the status of unfilled, copied, and saved.

24. An article of manufacture according to claim 21, wherein the program code further comprises:

a routine for presenting, by an appearance of the workflow display icons, a status of the display screen indicated by the icon, the access of the screen to the user including the accesses of read-write, read-only, and no access.

25. An article of manufacture according to claim 21, wherein the list is a product list.

26. An article of manufacture according to claim 21, wherein the program code further comprises:

a routine for deriving the list via a sequence of interactions between the user and the database, and a routine for filtering the list using a security filter which eliminates list elements for which the user is denied access.

27. An article of manufacture according to claim 21, wherein the predetermined order of the plurality of workflow display icons is selected from a business unit order, a user-specified order, and an ALL-inclusive order.

* * * * *